United States Patent
Tomida

(10) Patent No.: US 10,239,541 B2
(45) Date of Patent: Mar. 26, 2019

(54) ARTICLE TRANSPORT VEHICLE

(71) Applicant: Daifuku Co., Ltd., Osaka-shi (JP)

(72) Inventor: Daichi Tomida, Omihachiman (JP)

(73) Assignee: Daifuku Co., Ltd., Osaka-shi (JP)

( * ) Notice: Subject to any disclaimer, the term of this patent is extended or adjusted under 35 U.S.C. 154(b) by 212 days.

(21) Appl. No.: 15/279,916

(22) Filed: Sep. 29, 2016

(65) Prior Publication Data

US 2017/0096148 A1    Apr. 6, 2017

(30) Foreign Application Priority Data

Oct. 1, 2015 (JP) ................. 2015-195941

(51) Int. Cl.
*B61C 3/00* (2006.01)
*B60L 5/00* (2006.01)
*B61B 13/04* (2006.01)

(52) U.S. Cl.
CPC ............. *B61C 3/00* (2013.01); *B60L 5/005* (2013.01); *B61B 13/04* (2013.01); *B60L 2200/26* (2013.01)

(58) Field of Classification Search
CPC ..... B61L 1/00; B61L 1/02; B61B 3/00; B61B 3/02; B61B 5/00; B61B 5/02; B61B 13/00; B61B 13/04
See application file for complete search history.

(56) References Cited

U.S. PATENT DOCUMENTS 8,448,579 B2 * 5/2013 Inui .................. B60L 5/005
                                                         104/288
2012/0312188 A1    12/2012 Inui

FOREIGN PATENT DOCUMENTS

| JP | 2003118568 A | 4/2003 |
| JP | 2011116313 A | 6/2011 |
| JP | 2012121441 A | 6/2012 |

* cited by examiner

*Primary Examiner* — Robert J McCarry, Jr.
(74) *Attorney, Agent, or Firm* — The Webb Law Firm

(57) ABSTRACT

An article transport vehicle includes a travel member capable of traveling along a travel path, a support member located below the travel member for supporting an article, and a connecting member which connects the travel member and the support member to each other. The connecting member includes a travel member side connecting portion connected to the travel member, a support member side connecting portion connected to the support member, and an elastic member which is elastically deformable. The travel member side connecting portion and the support member side connecting portion are connected to each other for relative movement along the vertical direction. An elastic member is interposed between the travel member side connecting portion and the support member side connecting portion.

11 Claims, 7 Drawing Sheets

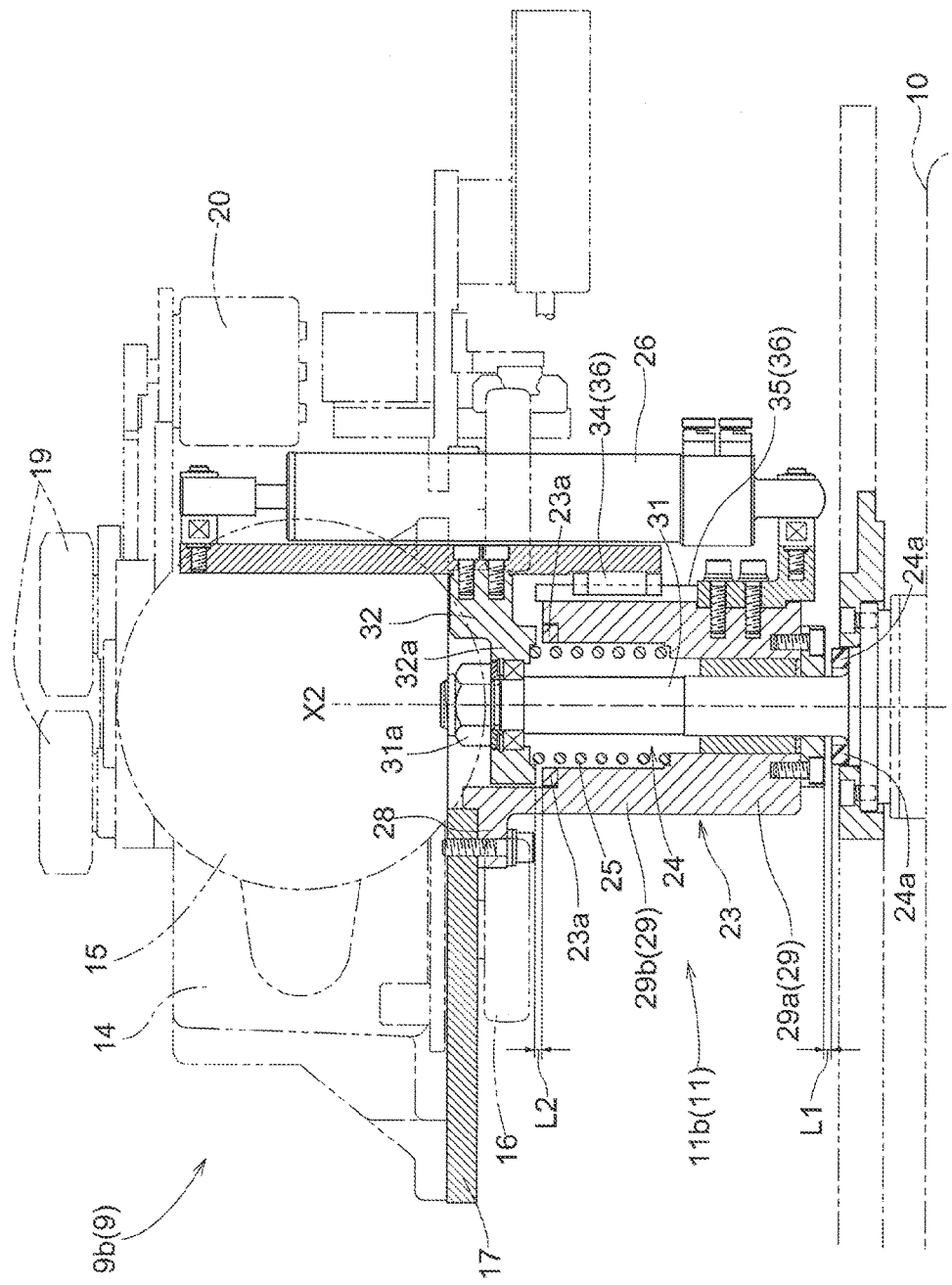

ARTICLE TRANSPORT VEHICLE

CROSS-REFERENCE TO RELATED APPLICATION

This application claims priority to Japanese Patent Application No. 2015-195941 filed Oct. 1, 2015, the disclosure of which is hereby incorporated in its entirety by reference.

FIELD OF THE INVENTION

The present invention relates to an article transport vehicle which is capable of traveling along a travel rail.

BACKGROUND

JP Publication of Application No. 2011-116313 describes an article transport vehicle comprising travel members configured to travel along travel rails, a support member located below the travel members for supporting an article, and connecting members for connecting the travel members and the support member to each other.

In this article transport vehicle, when there is a step in a travel rail and a vertical vibration or jolt occurs as the vehicle travels over the step, the vibration can be easily transmitted to the support member and, in turn, to the article through the connecting members. When the vibration of the travel members is transmitted to the article supported by the support member, the article may be damaged by the vibration. Therefore, it is desirable to reduce any vertical vibration that is transmitted to the article when a travel member travels over a step in a travel rail.

Incidentally, each travel member of the article transport vehicle described in the aforementioned patent has driven wheels which roll on the travel surfaces of the travel rails, and an electric motor which drivingly rotates the driven wheels. Since the space between the driven wheels and the electric motor is small, it is not easy to provide a mechanism for absorbing vertical vibration, between the driven wheels and the electric motor. In addition, the support member of the article transport vehicle described in the aforementioned patent is provided with a gripper. And the support member is configured to support an article with the article suspended therefrom by inserting the gripper under a flange formed in the upper end portion of the article. Since the space under the flange is also small, it is not easy to provide the gripper with a mechanism for absorbing vertical vibration.

SUMMARY OF THE INVENTION

In light of the above, an article transport vehicle is desired in which it is easy to provide a mechanism for absorbing vertical vibration.

In one preferable embodiment, an article transport vehicle comprises a travel member capable of traveling along a travel path, a support member located below the travel member for supporting an article, and a connecting member which connects the travel member and the support member to each other, wherein the connecting member includes a travel member side connecting portion connected to the travel member, a support member side connecting portion connected to the support member, and an elastic member which is elastically deformable, wherein the travel member side connecting portion and the support member side connecting portion are connected to each other for relative movement along the vertical direction, and wherein the elastic member is interposed between the travel member side connecting portion and the support member side connecting portion.

With the arrangement described above, since the travel member side connecting portion and the support member side connecting portion are connected to each other for relative movement along the vertical direction, and since the elastic member is interposed between the travel member side connecting portion and the support member side connecting portion, any vertical vibration which may occur in the travel member can be absorbed by the connecting member. Thus, any vertical vibration, which can otherwise be transmitted to the article supported by the support member when the travel member travels over a step in a travel rail, can be reduced. The distance between the travel member and the support member is often relatively larger than, for example, a gap formed between the driven wheels and an electric motor, or a space below a flange formed in an upper end portion of the article. Thus, providing an elastic member to the connecting member which connects the travel members and the support member to each other makes it easier to provide a mechanism for absorbing vertical vibrations.

BRIEF DESCRIPTION OF THE DRAWINGS

FIG. 7 is a side view showing an important portion of the travel member.

DETAILED DESCRIPTION OF EMBODIMENTS

Figure 1:
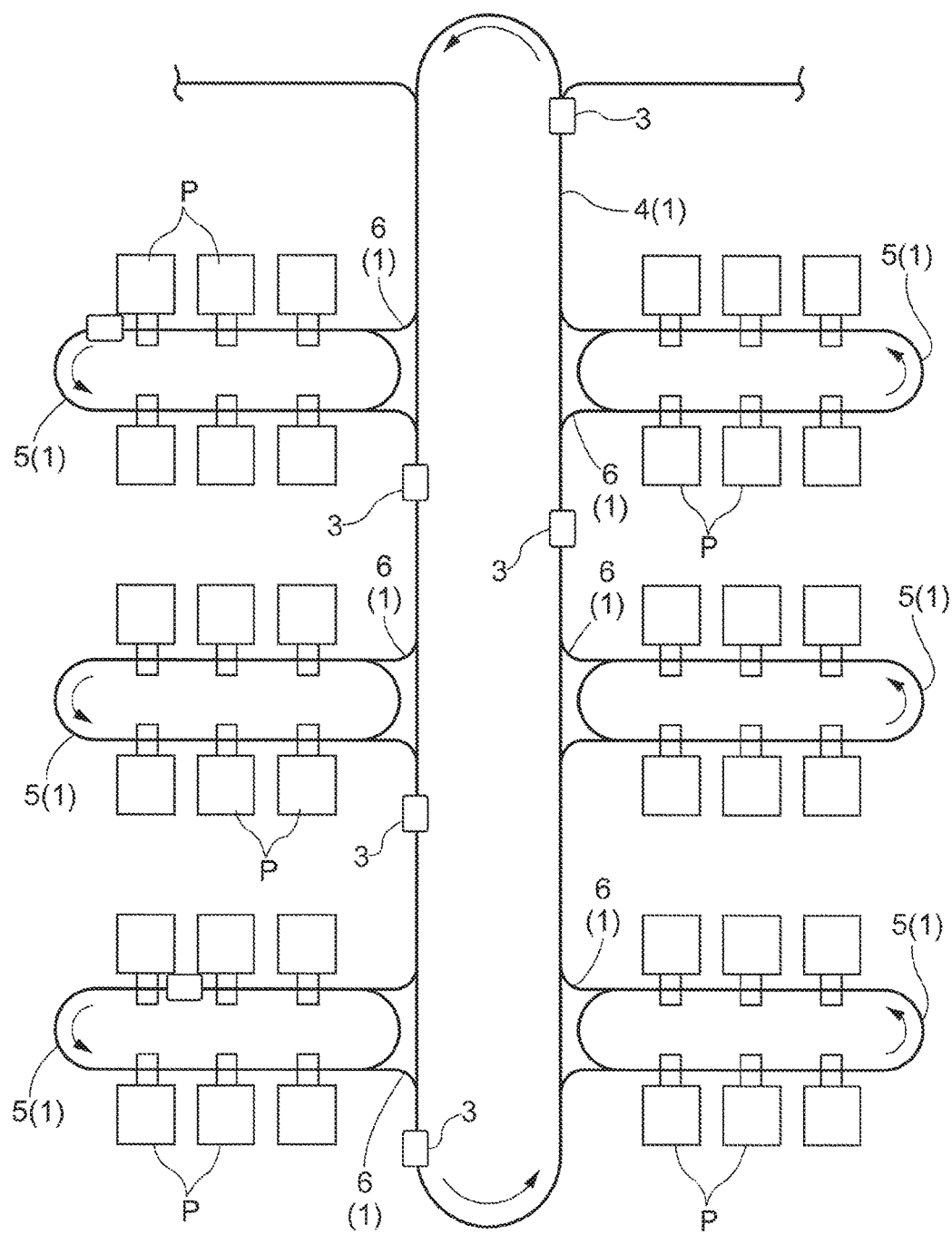
FIG. 1 is a plan view of an article transport facility.
Figure 2:
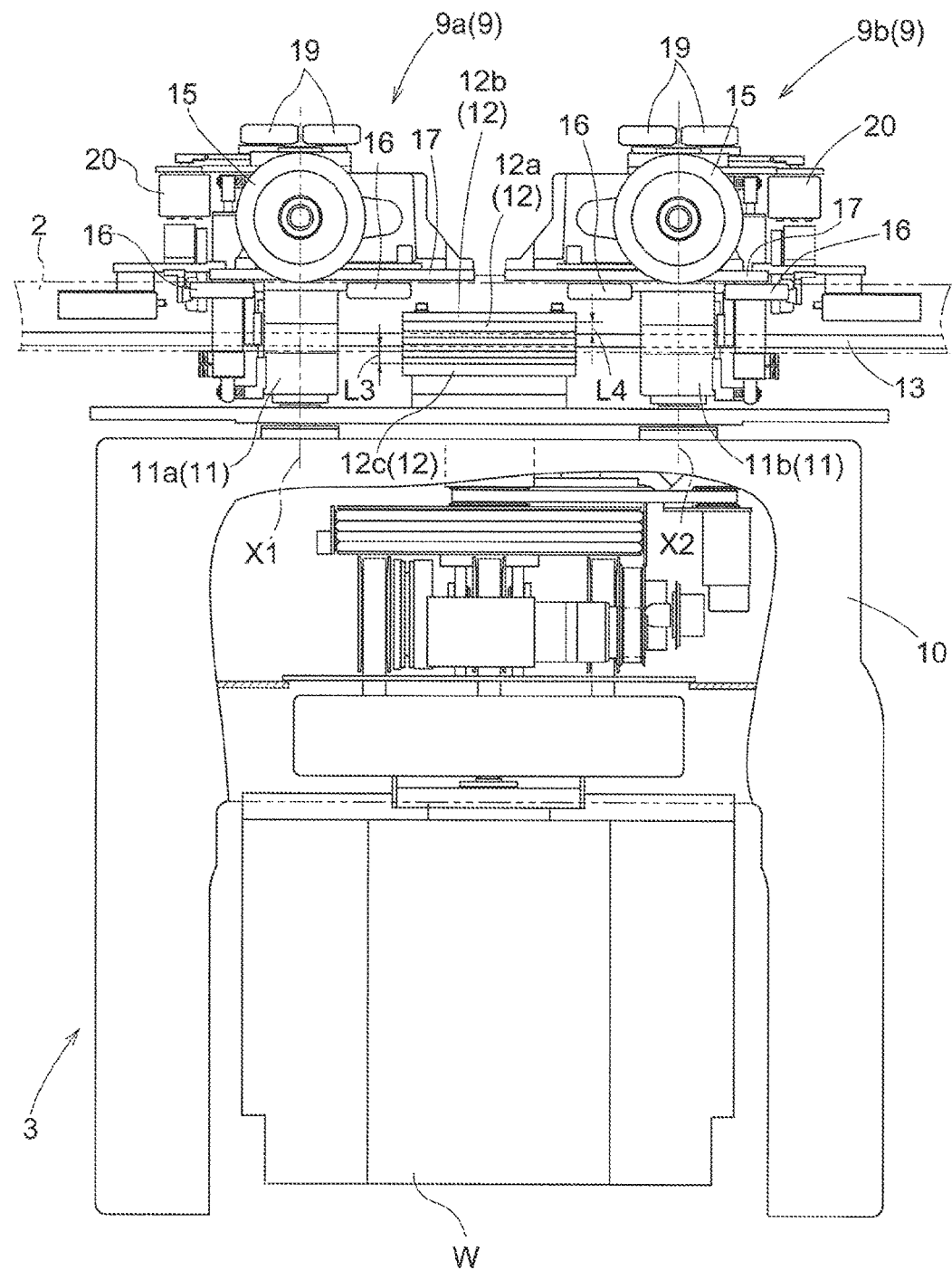
FIG. 2 is a side view of an article transport vehicle.

Embodiments of an article transport vehicle are described next with reference to the drawings, taking an article transport facility equipped with article transport vehicles, as an example. As shown in FIGS. 1 and 2, the article transport facility includes travel rails 2 provided along each travel path 1, and article transport vehicles 3 which can travel along the travel paths 1 while being guided by the travel rails 2. Note that, in the present embodiment, each article transport vehicle 3 transports, as an article W, a FOUP (Front Opening Unified Pod) for holding one or more semiconductor substrates.

The travel paths 1 include one loop-shaped primary path 4, loop-shaped secondary paths 5 each of which extends by way of a plurality of article processors P (each for performing one or more processes on the contents of articles), and connecting paths 6 each of which connects the primary path 4 and a secondary path 5 to each other. The connecting paths 6 include branching connecting paths 6 each of which allows the article transport vehicles 3a to perform a "branching travel" from the primary path 4 toward a secondary path 5, and merging connecting paths 6 each of which allows the article transport vehicles 3 to perform a "merging travel" from the corresponding secondary path 5 toward the primary path 4. The article transport vehicles 3 travel along the primary path 4 and the plurality of secondary paths 5 in the same direction (counterclockwise in FIG. 1). Note that, in FIG. 1, the arrows indicate the directions in which the article transport vehicles 3 travel.

The article transport vehicles 3 are described next. Note that, in the following description, lateral direction is the direction perpendicular to the longitudinal direction of any given travel path 1 as seen along the vertical direction (up and down direction). In addition, the fore and aft direction of an article transport vehicle 3 is the direction perpendicular to a rotation axis of driven wheels 15 described below. And when an article transport vehicle 3 is traveling along a straight portion of any travel path 1, the fore and aft direction of the article transport vehicle 3 coincides with the longitudinal direction of the travel path 1. In addition, the direction perpendicular to the fore and aft direction of the article transport vehicle 3 (direction along which the rotation axis of driven wheels 15 extends) as seen along the vertical direction will be referred to as the lateral direction as in the case of a travel path 1, as would be the case when the article transport vehicle 3 is traveling along a straight portion of any travel path 1.

Figure 3:
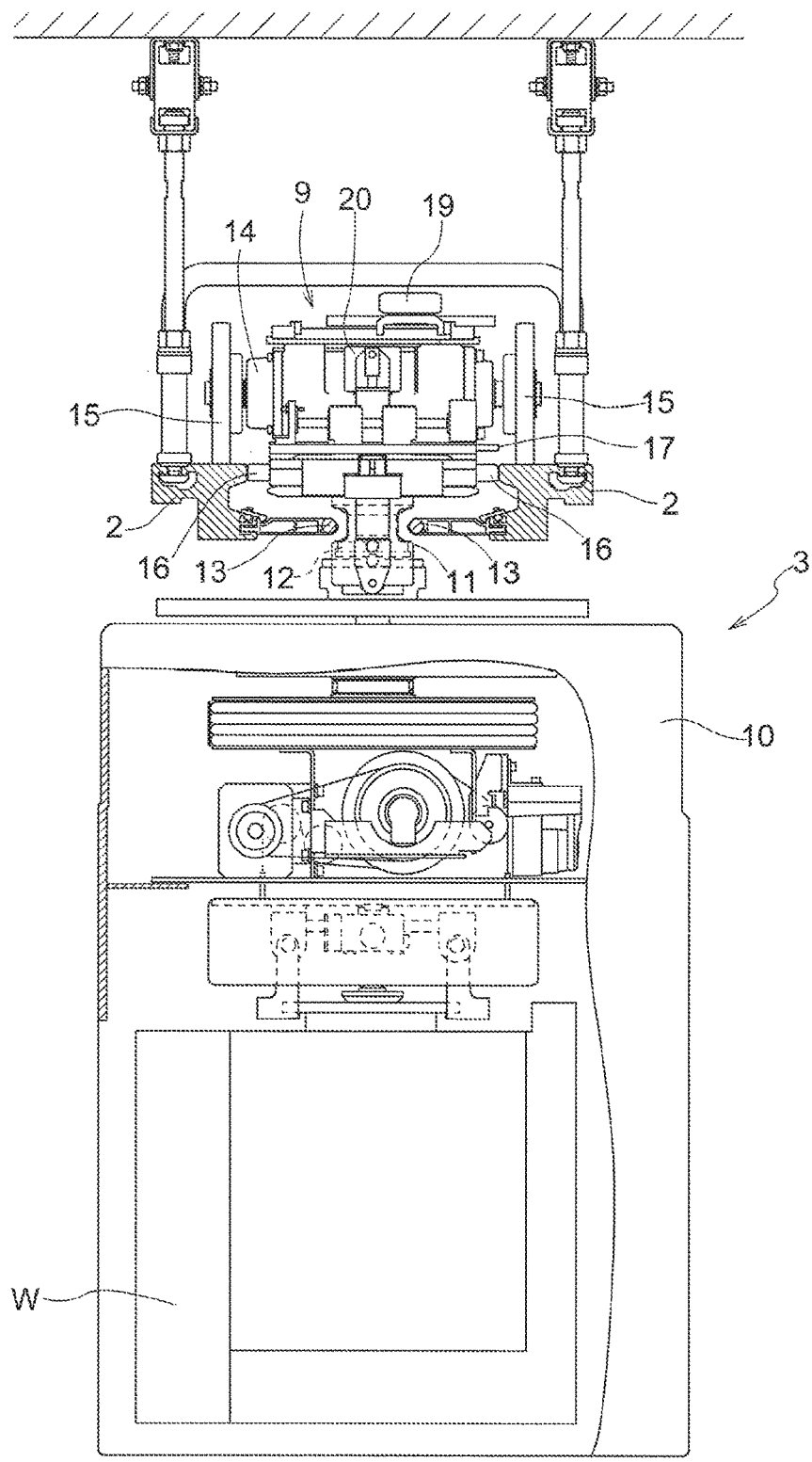
FIG. 3 is a front view of the article transport vehicle.
Figure 4:
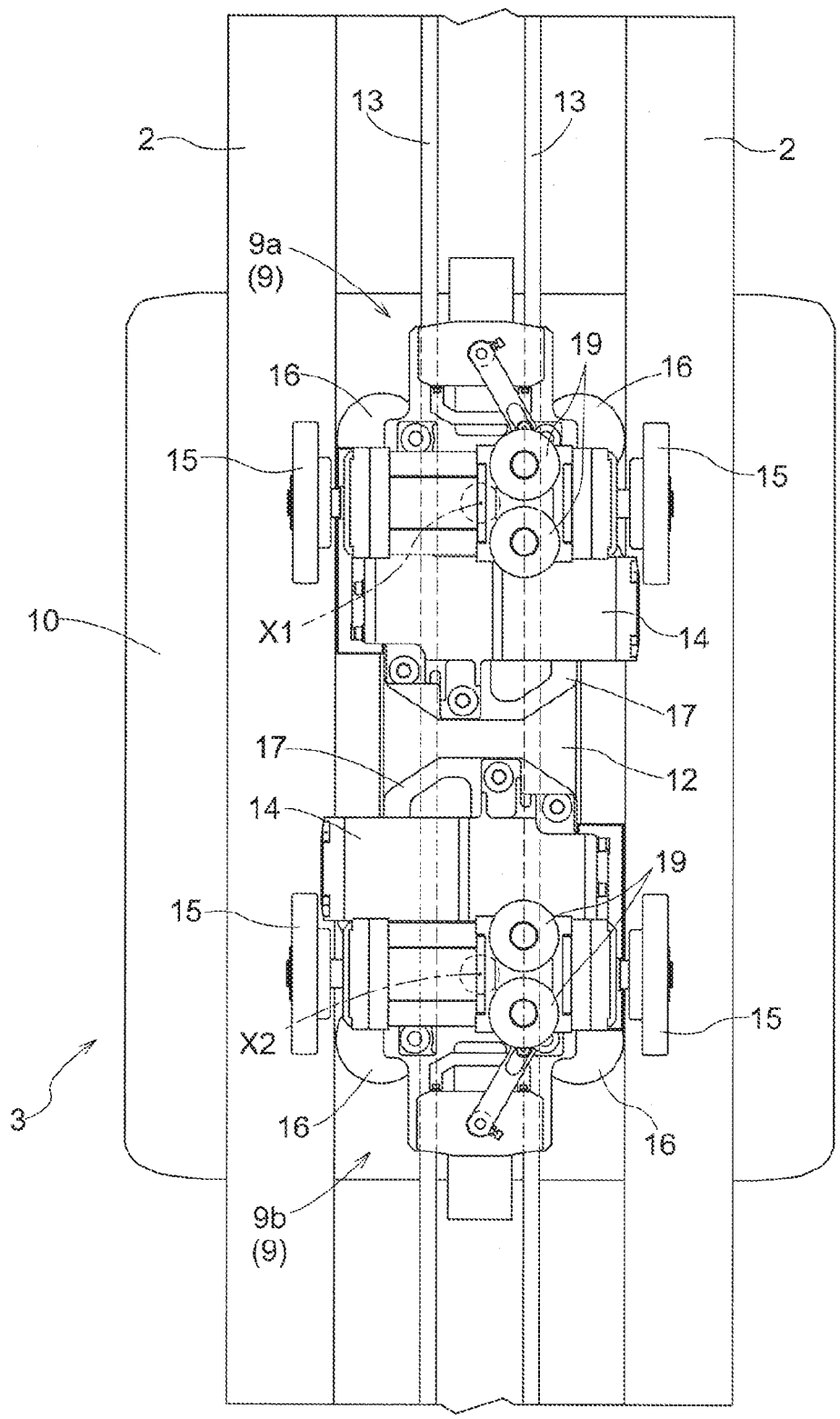
FIG. 4 is a plan view of the article transport vehicle.

As shown in FIGS. 2-4, each article transport vehicle 3 includes travel members 9 each configured to travel along travel rails 2, a support member 10 located below the travel members 9 for supporting an article W, and connecting members 11 each for connecting the corresponding travel member 9 and the support member 10 to each other. The travel rails 2 are a pair of right and left travel rails 2 suspended from and supported by a ceiling And the travel member 9 travels on the pair of right and left travel rails 2 and along the travel rails 2. Each travel member 9 is located above the pair of travel rails 2 except for its guide wheels 16, whereas the entire support member 10 is located below the pair of travel rails 2. The connecting members 11 are located between the pair of travel rails 2 along the lateral direction.

As the travel members 9, each article transport vehicle 3 includes a first travel member 9a, and a second travel member 9b located on one side, along the longitudinal direction of the travel path 1, (back side along the fore and aft direction) of this first travel member 9a. In addition, as the connecting members 11, the article transport vehicle 3 includes a first connecting member 11a which connects the first travel member 9a and the support member 10 to each other and a second connecting member 11b which connects the second travel member 9b and the support member 10 to each other. Incidentally, the second connecting member 11b is located on one side, along the longitudinal direction of the travel path 1, (back side along the fore and aft direction) of the first connecting member 11a.

The first travel member 9a includes a pair of right and left driven wheels 15 that are driven and rotated by an electric-powered actuating motor 14 (see FIG. 4). The pair of right and left driven wheels 15 roll on respective upward-facing travel surfaces of the pair of right and left travel rails 2. In addition, the first travel member 9a includes pairs of right and left guide wheels 16 with each guide wheel 16 being freely rotatable about a corresponding axis extending along the vertical direction (i.e., about a vertical axis). The pairs of right and left guide wheels 16 are so arranged that the guide wheels 16 are in contact with respective inner and inward surfaces of the pair of right and left travel rails 2. The actuating motor 14, the pair of right and left driven wheels 15, and the pairs of right and left guide wheels 16 are supported by a base frame 17. Note that the pairs of right and left guide wheels 16 consist of two pairs of right and left guide wheels 16 provided to the first travel member 9a, with one pair spaced apart from the other pair along the fore and aft direction. As with the first travel member 9a, the second travel member 9b includes an actuating motor 14, one pair of right and left driven wheels 15, two pairs of right and left guide wheels 16, and a base frame 17. As such, each travel member 9 includes driven wheels 15 for rolling on the upward-facing travel surfaces of the travel rails 2, the electric-powered actuating motor 14 for driving and rotating the pair of right and left driven wheels 15, the guide wheels 16 in contact with and guided by the travel rails 2, and the base frame 17 which supports the actuating motor 14, the driven wheels 15, and the guide wheels 16.

The first connecting member 11a connects the first travel member 9a and the support member 10 to each other such that the first travel member 9a and the support member 10 can be pivoted relative to each other about a first axis X1 extending along the vertical direction. The second connecting member 11b connects the second travel member 9b and the support member 10 to each other such that the first travel member 9b and the support member 10 can be pivoted relative to each other about a second axis X2 extending along the vertical direction. The first axis X1 is located within the length, along the travel direction, of the first travel member 9a and within the width thereof along the lateral direction, and is so located to overlap with the first travel member 9a as seen along the vertical direction. The second axis X2 is located within the length, along the travel direction, of the second travel member 9b and within the width thereof along the lateral direction, and is so located to overlap with the second travel member 9b as seen along the vertical direction.

Each of the first travel member 9a and the second travel member 9b travels along the travel path 1 while maintaining its attitude along the travel path 1, as a result of the fact that two pairs of its guide wheels 16 are in contact with, and thus guided by, the pair of travel rails 2. More specifically, as shown in FIG. 5, each of the first travel member 9a and the second travel member 9b travels, when traveling along a straight portion of the travel path 1, in such an attitude that its travel direction is along the path longitudinal direction of the straight portion, and travels, when traveling along a curved portion of the travel path 1, in such an attitude that its travel direction is along the tangential direction (at each point) of the curved portion.

As shown in FIGS. 2-4, the support member 10 supports a power-receiving portion 12 for receiving driving electricity, without contact, from electricity supply lines 13 provided along each travel path 1. The power-receiving portion 12 is fixed to the top surface of the support member 10. The electricity supply lines 13 are provided along the travel path 1 such that their positions relative to the travel rails 2 are fixed. As shown in FIG. 2, the power-receiving portion 12 includes an intermediate portion 12a which is located between the pair of electricity supply lines 13 and at the same height as the pair of electricity supply lines 13, an upper portion 12b which extends to both sides along the lateral direction from an upper end of the intermediate portion 12a and which is located above the electricity supply lines 13, and a lower portion 12c which extends to both sides along the lateral direction from a lower end of the intermediate portion 12a and which is located below the electricity supply lines 13.

As shown in FIGS. 2 and 3, the first travel member 9a is provided with a pair of front and back guide auxiliary wheels 19 each of which is rotatable about an axis extending along the vertical direction, and an actuator 20 for integrally moving the pair of front and back guide auxiliary wheels 19 along the lateral direction. The pair of front and back guide auxiliary wheels 19 are located at a higher position than the driven wheels 15 whereas the actuator 20 is located at a higher position than at least the rotation axis of the driven wheels 15. Note that, as with the first travel member 9a, the second travel member 9b is provided with a pair of front and back guide auxiliary wheels 19 and an actuator 20.

Figure 5:
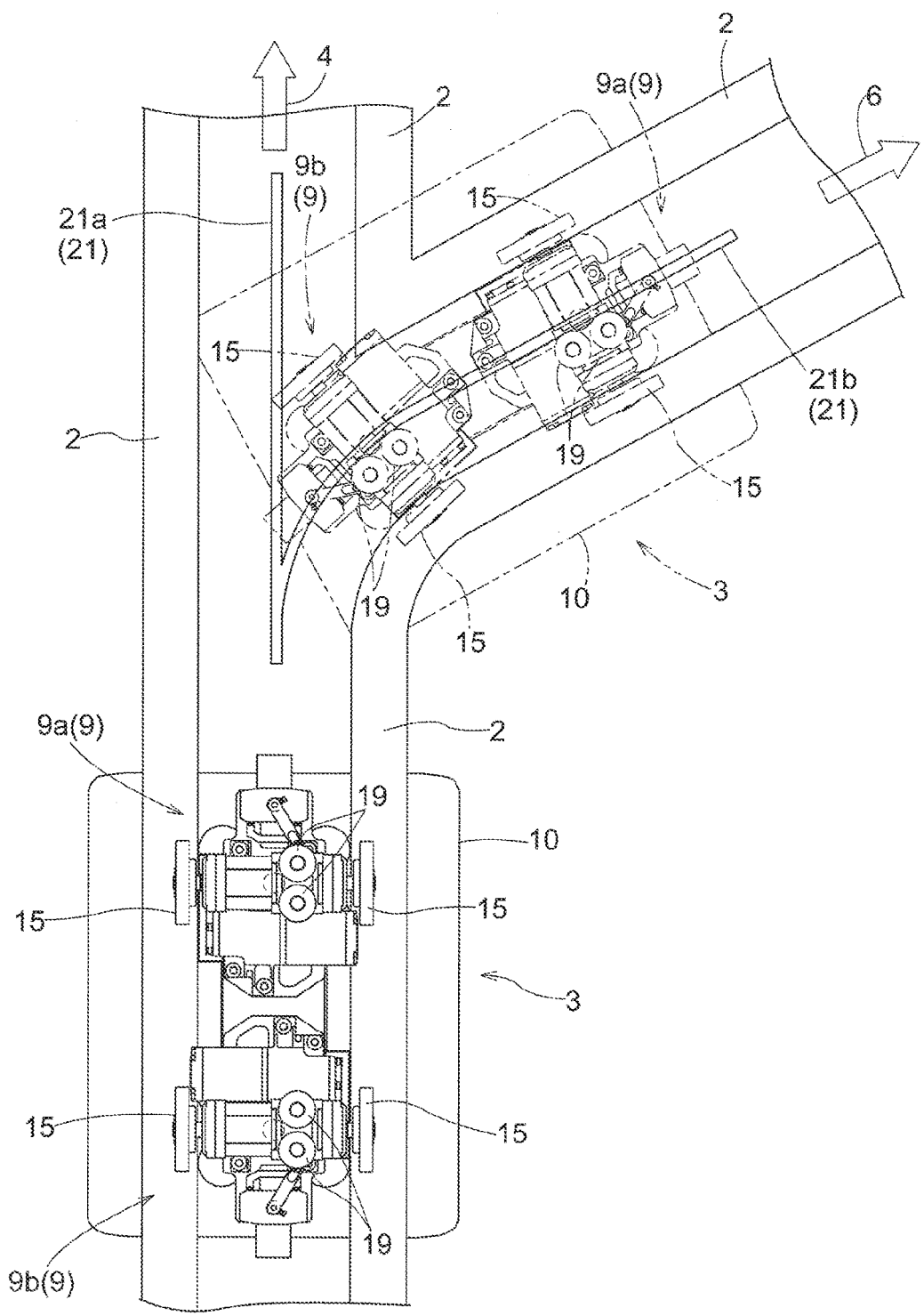
FIG. 5 is a plan view showing when the article transport vehicle is traveling in a branching path.
Figure 6:
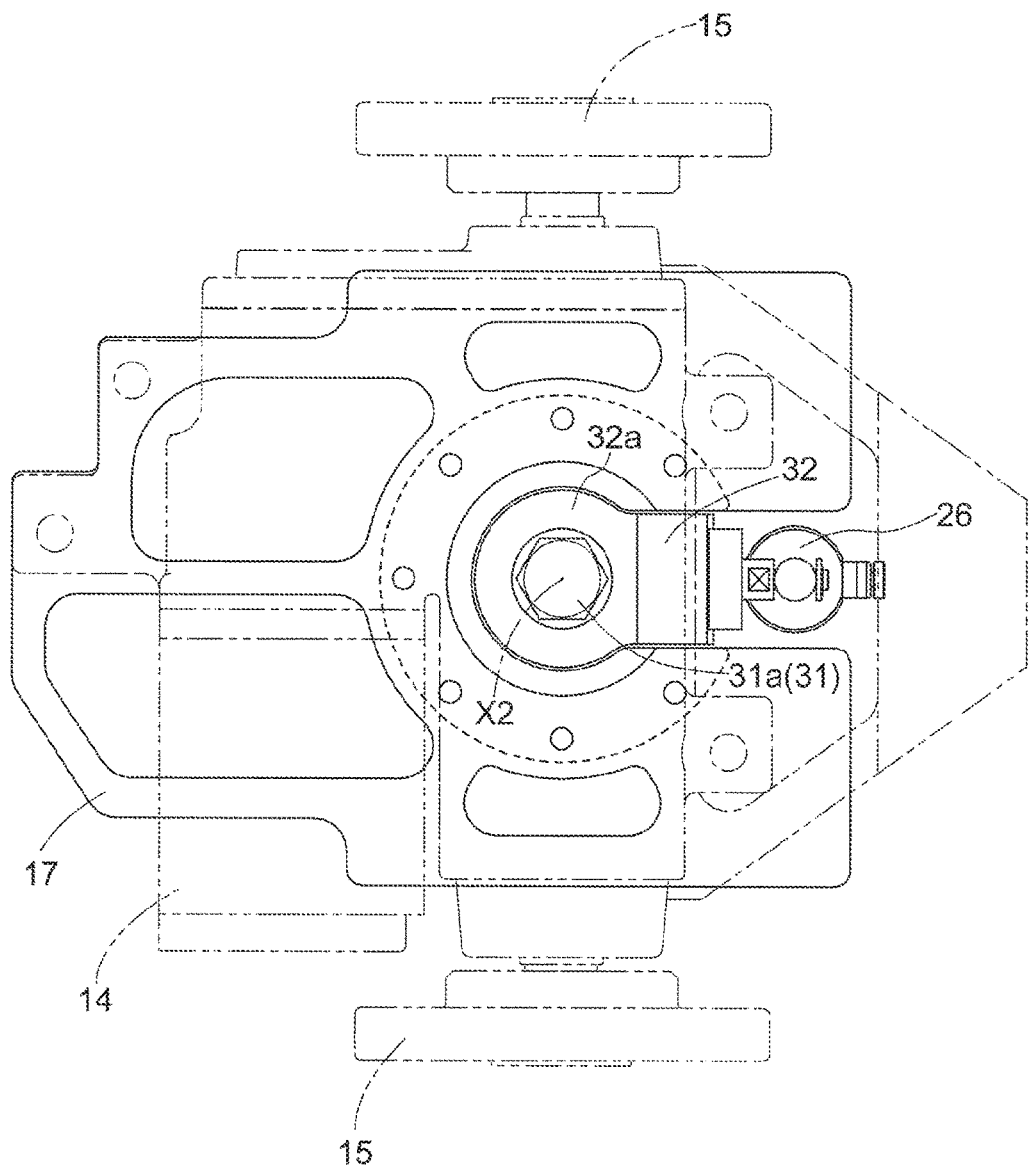
FIG. 6 is a plan view of an important portion of a travel member.

As shown in FIG. 5, guide rails 21 for guiding the guide auxiliary wheels 19 are provided in each connection portion in which a path branches off from a travel path 1 or a path merges into a travel path (a portion in which the primary path 4 and a connecting path 6 are connected to each other or a portion in which a secondary path 5 and a connecting path 6 are connected to each other). The guide rails 21 are installed at a higher position than the travel rails 2 and in a central area between the pair of right and left travel rails 2 in plan view (as seen along the vertical direction). The first travel member 9a is configured to move the position of the pair of front and back guide auxiliary wheels 19 by moving the pair of front and back guide auxiliary wheels 19 along the vehicle body lateral direction by means of the actuator 20 to a right guiding position at which the pair of front and back guide auxiliary wheels 19 are located on the right side of the center along the vehicle body lateral direction of the first travel member 9a (position shown in FIG. 5) and are in contact with a guide rail 21 from the right hand side, and to a left guiding position at which the pair of front and back guide auxiliary wheels 19 are located on the left side of the center along the vehicle body lateral direction of the first travel member 9a and are in contact with a guide rail 21 from the left hand side. As with the first travel member 9a, the second travel member 9b is configured to move the position of the pair of front and back guide auxiliary wheels 19 to a right guiding position and a left guiding position by means of the actuator 20.

As shown in FIG. 5, provided as the guide rails 21 in each connection portion of a travel path 1 are a straight guide rail 21a installed along the straight portion of the travel path 1, and a curved guide rail 21b installed along the curved portion of the travel path 1. When an article transport vehicle 3 traveling along the primary path 4 enters a connection portion in which a path branches off from the primary path 4 and into a connecting path 6, the article transport vehicle 3 would travel with the guide auxiliary wheels 19 located on the left hand side of the straight guide rail 21a if it enters the connection portion with the two pairs of front and back guide auxiliary wheels 19 (referred hereinafter to simply as the guide auxiliary wheels 19) moved to the left guiding position. This causes the article transport vehicle 3 to travel straight forward along the primary path 4 without the guide auxiliary wheels 19 being guided by the curved guide rail 21b. In addition, when an article transport vehicle 3 traveling along the primary path 4 enters a connection portion in which a path branches off from the primary path 4 and into a connecting path 6, the article transport vehicle 3 would travel with the guide auxiliary wheels 19 located on the right hand side of the straight guide rail 21a if it enters the connection portion with the guide auxiliary wheels 19 moved to the right guiding position. This causes the guide auxiliary wheels 19 to be guided by the curved guide rail 21b and the article transport vehicle 3 to perform a branching travel from the primary path 4 and into the connecting path 6.

The connecting members 11 for connecting the respective travel members 9 and the support member 10 are described next. Note that the first connecting member 11a and the second connecting member 11b have the same structure except for the fact that locations, along the fore and aft direction, of corresponding parts are reversed between the first connecting member 11a and the second connecting member 11b so that, for example, if the first connecting member 11a has a part that is located on the front side (with respect to the fore and aft direction) of the first connecting member 11a, the corresponding part of the second connecting member 11b would be located on the back side of the second connecting member 11b. Thus, the second connecting member 11b is described as a connecting member 11 with description of the first connecting member 11a omitted.

As shown in FIG. 7, the connecting member 11 includes a travel member side connecting portion 23 connected to the corresponding travel member 9, a support member side connecting portion 24 connected to the support member 10, an elastic member 25 which is elastically deformable, and a damper 26 which is extendable and contractible along the vertical direction and which can be of any conventional design such as a pneumatic or hydraulic damper. The travel member side connecting portion 23 and the support member side connecting portion 24 are connected to each other for relative movement along the vertical direction. And the elastic member 25 is interposed between the travel member side connecting portion 23 and the support member side connecting portion 24.

The travel member side connecting portion 23 includes a first connecting portion 28 connected to the travel member 9, a first portion 29 in which the insert or through hole is formed. And the first connecting portion 28 and the first portion 29 are integrally formed. The support member side connecting portion 24 includes a second connecting portion 31 which is generally rod-shaped and is connected to the support member 10, and a second portion 32 in which the insert or through hole is formed. And the second connecting portion 31 and the second portion 32 are separately formed. Note that the second connecting portion 31 is the rod-shaped portion which is inserted and arranged vertically in the insert hole of the first portion 29.

Regarding the second connecting portion 31, the lower end portion of the second connecting portion 31 is fixed to an upper end portion of the support member 10. And a female screw portion 31a, which includes a nut, meshes with an upper end portion of the second connecting portion 31. And a vertically intermediate portion of the second connecting portion 31 is inserted and arranged vertically in the insert hole of the first portion 29, and the insert hole of the second portion 32. A first small diameter tubular portion 29a, in which the insert hole of the first portion 29 is formed, is provided with a ball bushing so that the first portion 29 and the second connecting portion 31 can be rotated or pivoted relative to each other about the second axis X2. In addition, a second small diameter tubular portion 32a, in which the insert hole of the second portion 32 is formed, is provided with a bearing so that the second portion 32 and the second connecting portion 31 can be rotated or pivoted relative to each other about the second axis X2.

The second portion 32 is provided with a guided portion 34 whereas the first portion 29 is provided with a guide rail 35, which the guided portion 34 engages, for guiding the guided portion 34 along the vertical direction. Because the guided portion 34 is in engagement with the guide rail 35, the first portion 29 and the second portion 32 are connected to each other such that they cannot be moved relative to each other along the fore and aft direction and the lateral direction while they are allowed to be moved relative to each other along the vertical direction. And the guided portion 34 and the guide rail 35 form a first guide mechanism 36 for guiding the movement of the support member side connecting portion 24 relative to the travel member side connecting portion 23 along the vertical direction. In addition, the second connecting portion 31 and the first small diameter tubular portion 29a form a second guide mechanism for guiding the movement of the support member side connecting portion 24 relative to the travel member side connecting portion 23 along the vertical direction. The first guide mechanism 36 is located to one side (back side), along the travel direction of the travel member 9, with respect to the second axis X2 and a large diameter tubular portion 29b described below, and overlaps with the second connecting portion 31 of the support member side connecting portion 24 as seen along the travel direction of the travel member 9.

The elastic member 25 is formed by a coil spring and is located to encircle the side of the second connecting portion 31. And a top surface of the first small diameter tubular portion 29a is formed to be an upward-facing surface of the first portion 29 whereas a lower surface of the second small diameter tubular portion 32a is formed to be a downward-facing surface of the second portion 32 so that the elastic member 25 is held in a vertically compressed state between the upward-facing surface of the first portion 29 and the downward-facing surface of the second portion 32. Note that the coil spring is generally formed to have a spiral shape and thus the elastic member 25 can be said to be generally tubular in shape in the sense that the elastic member 25, as a whole, occupies a space that is generally tubular in shape. The first portion 29 has a large diameter tubular portion 29b which extends upward from the first small diameter tubular portion 29a. This large diameter tubular portion 29b is formed such that its inner diameter is greater than that of the first small diameter tubular portion 29a. And the elastic member 25 is located within this large diameter tubular portion 29b. Note that this large diameter tubular portion 29b is, or corresponds to, the tubular portion that surrounds the side of the elastic member 25, and is provided to the travel member side connecting portion 23.

As described above, the connecting member 11 is arranged such that the travel member side connecting portion 23 and the support member side connecting portion 24 are connected to each other for relative movement along the vertical direction. And the travel member side connecting portion 23 and the support member side connecting portion 24 are guided along the vertical direction, as a result of the fact that the second connecting portion 31 of the support member side connecting portion 24 is vertically inserted in, and fitted into, the first small diameter tubular portion 29a of the travel member side connecting portion 23, and the fact that the guided portion 34 connected to the support member side connecting portion 24 is in engagement with the guide rail 35 connected to the travel member side connecting portion 23 for vertical movement. In addition, the travel member 9 and the support member 10 are configured to be pivotable relative to each other about the second rotation axis X2 as a result of the fact that the second connecting portion 31 of the support member side connecting portion 24 is pivotable about the second rotation axis X2 relative to the second portion 32 of the support member side connecting portion 24 and the travel member side connecting portion 23. Thus, the connecting member 11 connects the travel member 9 and the support member 10 to each other such that the travel member 9 and the support member 10 are pivotable relative to each other about the second axis X2.

And the single connecting member 11 is connected to the base frame 17 which supports the pair of right and left driven wheels 15. And this single connecting member 11 is provided with the elastic member 25 shared by (i.e., a common elastic member 25 is provided for) the pair of right and left driven wheels 15. Thus, as shown with dashed lines in FIG. 5, the right and left driven wheels 15 are located at the same height, even during the period from the time the left driven wheel 15 of the travel member 9 leaves a straight travel rail 2 and until the time the left driven wheel 15 reaches and runs over a curved travel rail 2, which reduces any impact or jolt that may occur when the left driven wheel 15 runs over the curved travel rail 2.

As shown in FIG. 7, the connecting member 11 has a first restricting portion 24a for preventing the support member side connecting portion 24 from moving upward relative to the travel member side connecting portion 23 by a distance greater than or equal to a first distance L1 from a normal positional relationship and a second restricting portion 23a for preventing the support member side connecting portion 24 from moving downward relative to the travel member side connecting portion 23 by a distance greater than or equal to a second distance L2 from the normal positional relationship. The normal positional relationship refers to a positional relationship along the vertical direction between the travel member side connecting portion 23 and the support member side connecting portion 24 in a normal state. Here, the normal state is a state in which the travel member 9 is at rest and the support member side connecting portion 24 is supported by the travel member side connecting portion 23 through the elastic member 25.

And as shown in FIG. 2, in the normal positional relationship, the vertical distance L3 between the electricity supply lines 13 and the lower portion 12c is less than the first distance L1, and the vertical distance L4 between the electricity supply lines 13 and the upper portion 12b is less than the second distance L2. In other words, even when the support member 10 is moved vertically relative to the travel member 9 traveling on the travel rails 2, such vertical movement is restricted to within a range in which the power-receiving portion 12 would not come into contact with the electricity supply lines 13 so that the power-receiving portion 12 or the electricity supply lines 13 would not be damaged due to a contact between the power-receiving portion 12 and the electricity supply lines 13. Note that the normal positional relationship may be defined either with the support member 10 supporting an article W or with the support member 10 not supporting any article W. However, it is preferable that the vertical movement of the support member 10 relative to the travel member 9 is restricted to within such a range that the power-receiving portion 12 would not come into contact with the electricity supply lines 13 in either case.

Alternative Embodiments (1) In the embodiment described above, a coil spring is used as an elastic member which is a generally tubular in shape; however, a member formed of resin and having a shape of a circular cylinder or tube may be used as the tubular elastic member. In addition, although the elastic member is formed to be generally tubular in shape, the elastic member may be generally formed to be circular cylinder or a circular pillar in shape. As such, the shape of the elastic member may be changed as appropriate.

(2) In the embodiment described above, the first guide mechanism and the second guide mechanism are provided. However, only one of the first guide mechanism and the second guide mechanisms may be provided. In addition, when the first guide mechanism is provided, the first guide mechanism may be located at a position which is displaced relative to the second connecting portion along the lateral (right and left) direction such that it does not overlap with the second connecting portion.

(3) In the embodiment described above, the travel member side connecting portion has the tubular portion; however, the support member side connecting portion may have the tubular portion. Alternatively, the travel member side connecting portion may have a lower portion of the tubular portion whereas the support member side connecting portion may have an upper portion of the tubular portion so that both the travel member side connecting portion and support member side connecting portion jointly have the tubular portion.

(4) In the embodiment described above, each pair of right and left driven wheels share a single elastic member; however, an elastic member may be provided for each of the right and left driven wheels of each pair. More specifically, for example, the travel member may be formed by a right-hand side travel member equipped with the right driven wheel of the pair of right and left driven wheels and a left-hand side travel member equipped with the left driven wheel of the pair of right and left driven wheels. And the right-hand side travel member and the support member may be connected to each other by means of a connecting member having an elastic member, and the left-hand side travel member and the support member may be connected to each other by means of a connecting member having another and separate elastic member.

(5) In the embodiment described above, the elastic member is arranged to be in a compressed state; however, an upper portion of the elastic member may be connected the travel member side connecting portion and a lower portion of the elastic member may be connected to support member side connecting portion such that the elastic member is in a tensioned state.

(6) In the embodiment described above, the travel member is formed with the first travel member and the second travel member; however, the travel member may be of a one member structure. In addition, although each travel member and the support member are connected by a connecting member to each other such that the travel member and the support member are pivotable relative to each other; however, each travel member and the support member may be connected to each other by means of a connecting member such that they cannot be pivoted relative to each other.

(7) In the embodiment described above, the article transport vehicle is provided with the power-receiving portion with the power-receiving portion provided to, and supported by, the support member, in order to supply electric power to the article transport vehicle from the electricity supply lines without contact. However, it is not necessary to provide the article transport vehicle with the power-receiving portion if and when a battery is mounted on the article transport vehicle.

The article transport vehicle described above is briefly summarized next.

In one preferable embodiment, an article transport vehicle comprises a travel member capable of traveling along a travel path, a support member located below the travel member for supporting an article, and a connecting member which connects the travel member and the support member to each other, wherein the connecting member includes a travel member side connecting portion connected to the travel member, a support member side connecting portion connected to the support member, and an elastic member which is elastically deformable, wherein the travel member side connecting portion and the support member side connecting portion are connected to each other for relative movement along the vertical direction, and wherein the elastic member is interposed between the travel member side connecting portion and the support member side connecting portion.

With the arrangement described above, since the travel member side connecting portion and the support member side connecting portion are connected to each other for relative movement along the vertical direction, and since the elastic member is interposed between the travel member side connecting portion and the support member side connecting portion, any vertical vibration which may occur in the travel member can be absorbed by the connecting member. Thus, any vertical vibration, which can otherwise be transmitted to the article supported by the support member when the travel member travels over a step in a travel rail, can be reduced. The distance between the travel member and the support member is often relatively larger than, for example, a gap formed between the driven wheels and an electric motor, or a space below a flange formed in an upper end portion of the article. Thus, providing an elastic member to the connecting member which connects the travel members and the support member to each other makes it easier to provide a mechanism for absorbing vertical vibrations.

Here, the travel member side connecting portion preferably includes a first portion in which an insert hole is formed, wherein the support member side connecting portion preferably includes a rod-shaped portion inserted in the insert hole along a vertical direction, and a second portion provided to an upper portion of the rod-shaped portion, wherein the elastic member is preferably formed to be generally tubular in shape and is arranged to encircle a side of the rod-shaped portion, wherein the elastic member is preferably held between, and compressed vertically by, an upward-facing surface of the first portion and a downward-facing surface of the second portion, and wherein at least one of the travel member side connecting portion and the support member side connecting portion preferably has a tubular portion that surrounds a side of the elastic member.

With this arrangement, since the elastic member is provided so as to be held between, and compressed by, the first portion and the second portion, there is no need to connect the elastic member to neither the first portion nor the second portion, as would have been the case if the elastic member was arranged to be in a tensioned state. Thus, providing the elastic member is made easier by this arrangement. In addition, the rod-shaped portion is located in the space encircled by the elastic member which is generally tubular in shape, and the tubular portion lies outside the elastic member generally tubular in shape; thus, it is difficult for the elastic member to collapse on itself even when the elastic member is vertically compressed by the first portion and the second portion.

In addition, the article transport vehicle preferably further comprises a guide mechanism for guiding a relative movement of the support member side connecting portion with respect to the travel member side connecting portion along the vertical direction, wherein the guide mechanism is preferably located to one side, along a travel direction of the travel member, of the tubular portion, and overlaps with the rod-shaped portion of the support member side connecting portion as seen along the travel direction of the travel member.

With this arrangement, since the relative movement between the support member side connecting portion and the travel member side connecting portion is guided by the guide mechanism, these portions can be moved vertically and relative to each other smoothly. And since the guide mechanism overlaps with the rod-shaped portion of the support member side connecting portion as seen along the travel direction of the travel member, it is difficult for a torsional force to act on the guide portion when the travel member accelerates and decelerates, which makes it more difficult for the guide mechanism to be damaged.

In addition, the travel member preferably includes a pair of right and left driven wheels which roll on respective upward-facing travel surfaces of travel rails installed along the travel path, and wherein the elastic member is preferably shared by the pair of right and left said driven wheels.

With this arrangement, since the elastic member is shared by the pair of right and left said driven wheels, the pair of right and left driven wheel move vertically together or integrally when the elastic member expands and contracts along the vertical direction. Thus, when a gap exists at a joint of a travel rail, for example, and one of the pair of right and left driven wheels is located directly above the gap in the travel rail, even then, that driven wheel would not fall into the gap with the other driven wheel would still on the travel surface of the other travel rail. Thus this arrangement allows the wheels to travel smoothly over the joints in the rails.

In addition, the travel member is a first travel member, and a second travel member is preferably provided which is located to one side, along a longitudinal direction of the travel path, of the first travel member, wherein the connecting member is a first connecting member which connects the first travel member and the support member to each other, and a second connecting member is preferably provided which connects the second travel member and the support member to each other, wherein the first connecting member preferably connects the first travel member and the support member to each other such that the first travel member and the support member are pivotable relative to each other about a first axis extending along the vertical direction, and wherein the second connecting member preferably connects the second travel member and the support member to each other such that the second travel member and the support member are pivotable relative to each other about a second axis extending along the vertical direction.

With this arrangement, the first travel member can change its direction of travel by being pivoted about the first axis whereas the second travel member can change its direction of travel by being pivoted about the second axis. Thus, when the article transport vehicle travels along a curved travel path, the article transport vehicle can travel along the curved travel path smoothly by allowing the first travel member and the second travel member to travel with their respective attitudes turned or pivoted to be in alignment with the tangential direction at each point along the travel path. And because the first travel member is connected to the support member by the first connecting member having its elastic member, and the second travel member is connected to the support member by the second connecting member having its elastic member, any vibration that may occur in each of the first travel member and the second travel member and that may otherwise be transmitted to the support member can be reduced.

In addition, with a direction perpendicular to a longitudinal direction of the travel path as seen along the vertical direction being defined to be a lateral direction, the support member preferably supports a power-receiving portion to which electric power is supplied, without contact, from an electricity supply line which is installed along the travel path and whose position is fixed relative to a travel rail installed along the travel path, wherein the power-receiving portion preferably includes an upper portion located at a higher position than the electricity supply line and a lower portion located at a lower position than the electricity supply line, wherein, with a normal positional relationship being defined to be a positional relationship along the vertical direction between the travel member side connecting portion and the support member side connecting portion when the travel member is at rest and the support member side connecting portion is supported by the travel member side connecting portion through the elastic member, the connecting member preferably includes a first restricting portion for preventing the support member side connecting portion from moving upward relative to the travel member side connecting portion by a distance greater than or equal to a first distance from the normal positional relationship, and a second restricting portion for preventing the support member side connecting portion from moving downward relative to the travel member side connecting portion by a distance greater than or equal to a second distance from the normal positional relationship, wherein a vertical distance between the electricity supply line and the lower portion is preferably less than the first distance, and wherein a vertical distance between the electricity supply line and the upper portion is preferably less than the second distance.

With this arrangement, when the support member side connecting portion is moved upward from the normal positional relationship relative to the travel member side connecting portion, the power-receiving portion is moved upward relative to the electricity supply line; however, further upward movement of the support member side connecting portion is prevented by the first restricting portion before the lower portion of the power-receiving portion interferes with, or come into contact with, the electricity supply line. And when the support member side connecting portion is moved downward from the normal positional relationship relative to the travel member side connecting portion, the power-receiving portion is moved downward relative to the electricity supply line; however, further downward movement of the support member side connecting portion is prevented by the first restricting portion before the upper portion of the power-receiving portion interferes with, or come into contact with, the electricity supply line. As such, by connecting the support member side connecting portion and the travel member side connecting portion to each other while allowing their relative movement and by restricting the relative movement between the first restricting portion and the second restricting portion, the power-receiving portion can be prevented from interfering with, or coming into contact with, the electricity supply line.

What is claimed is:

1. An article transport vehicle comprising:
 a travel member capable of traveling along a travel path;
 a support member located below the travel member for supporting an article; and
 a connecting member which connects the travel member and the support member to each other;
 wherein the connecting member includes a travel member side connecting portion connected to the travel member, a support member side connecting portion connected to the support member, and an elastic member which is elastically deformable,
 wherein the travel member side connecting portion and the support member side connecting portion are connected to each other for relative movement along the vertical direction, wherein the elastic member is interposed between the travel member side connecting portion and the support member side connecting portion, and wherein the connecting member further comprises a guide mechanism for guiding a relative movement of the support member side connecting portion with respect to the travel member side connecting portion along the vertical direction.

2. The article transport vehicle as defined in claim 1, wherein the travel member side connecting portion includes a first portion in which an insert hole is formed, wherein the support member side connecting portion includes a rod-shaped portion inserted in the insert hole along a vertical direction, and a second portion provided to an upper portion of the rod-shaped portion, wherein the elastic member is formed to be generally tubular in shape and is arranged to encircle a side of the rod-shaped portion, wherein the elastic member is held between, and compressed vertically by, an upward-facing surface of the first portion and a downward-facing surface of the second portion, and wherein at least one of the travel member side connecting portion and the support member side connecting portion has a tubular portion that surrounds a side of the elastic member.

3. The article transport vehicle as defined in claim 2, wherein the guide mechanism is located to one side, along a travel direction of the travel member, of the tubular portion, and overlaps with the rod-shaped portion of the support member side connecting portion as seen along the travel direction of the travel member.

4. The article transport vehicle as defined in claim 1, wherein the travel member includes a pair of right and left driven wheels which roll on respective upward-facing travel surfaces of travel rails installed along the travel path, and wherein the elastic member is shared by the pair of right and left said driven wheels.

5. The article transport vehicle as defined in claim 1, wherein the travel member is a first travel member, and a second travel member is provided which is located to one side, along a longitudinal direction of the travel path, of the first travel member, wherein the connecting member is a first connecting member which connects the first travel member and the support member to each other, and a second connecting member is provided which connects the second travel member and the support member to each other, wherein the first connecting member connects the first travel member and the support member to each other such that the first travel member and the support member are pivotable relative to each other about a first axis extending along the vertical direction, and wherein the second connecting member connects the second travel member and the support member to each other such that the second travel member and the support member are pivotable relative to each other about a second axis extending along the vertical direction.

6. The article transport vehicle as defined in claim 1, wherein with a direction perpendicular to a longitudinal direction of the travel path as seen along the vertical direction being defined to be a lateral direction, the support member supports a power-receiving portion to which electric power is supplied, without contact, from an electricity supply line which is installed along the travel path and whose position is fixed relative to a travel rail installed along the travel path, wherein the power-receiving portion includes an upper portion located at a higher position than the electricity supply line and a lower portion located at a lower position than the electricity supply line, wherein, with a normal positional relationship being defined to be a positional relationship along the vertical direction between the travel member side connecting portion and the support member side connecting portion when the travel member is at rest and the support member side connecting portion is supported by the travel member side connecting portion through the elastic member, the connecting member includes a first restricting portion for preventing the support member side connecting portion from moving upward relative to the travel member side connecting portion by a distance greater than or equal to a first distance from the normal positional relationship, and a second restricting portion for preventing the support member side connecting portion from moving downward relative to the travel member side connecting portion by a distance greater than or equal to a second distance from the normal positional relationship, and wherein a vertical distance between the electricity supply line and the lower portion is less than the first distance, and wherein a vertical distance between the electricity supply line and the upper portion is less than the second distance.

7. The article transport vehicle as defined in claim 3, wherein the travel member includes a pair of right and left driven wheels which roll on respective upward-facing travel surfaces of travel rails installed along the travel path, and wherein the elastic member is shared by the pair of right and left said driven wheels.

8. The article transport vehicle as defined in claim 7, wherein the travel member is a first travel member, and a second travel member is provided which is located to one side, along a longitudinal direction of the travel path, of the first travel member, wherein the connecting member is a first connecting member which connects the first travel member and the support member to each other, and a second connecting member is provided which connects the second travel member and the support member to each other, wherein the first connecting member connects the first travel member and the support member to each other such that the first travel member and the support member are pivotable relative to each other about a first axis extending along the vertical direction, and wherein the second connecting member connects the second travel member and the support member to each other such that the second travel member and the support member are pivotable relative to each other about a second axis extending along the vertical direction.

9. The article transport vehicle as defined in claim 8, wherein with a direction perpendicular to a longitudinal direction of the travel path as seen along the vertical direction being defined to be a lateral direction, the support member supports a power-receiving portion to which electric power is supplied, without contact, from an electricity supply line which is installed along the travel path and whose position is fixed relative to the travel rail, wherein the power-receiving portion includes an upper portion located at a higher position than the electricity supply line and a lower portion located at a lower position than the electricity supply line, wherein, with a normal positional relationship being defined to be a positional relationship along the vertical direction between the travel member side connecting portion and the support member side connecting portion when the travel member is at rest and the support member side connecting portion is supported by the travel member side connecting portion through the elastic member, the connecting member includes a first restricting portion for preventing the support member side connecting portion from moving upward relative to the travel member side connecting portion by a distance greater than or equal to a first distance from the normal positional relationship, and a second restricting portion for preventing the support member side connecting portion from moving downward relative to the travel member side connecting portion by a distance greater than or equal to a second distance from the normal positional relationship, and wherein a vertical distance between the electricity supply line and the lower portion is less than the first distance, and wherein a vertical distance between the electricity supply line and the upper portion is less than the second distance.

10. An article transport vehicle comprising:

a travel member capable of traveling along a travel path;

a support member located below the travel member for supporting an article; and a connecting member which connects the travel member and the support member to each other;

wherein the connecting member includes a travel member side connecting portion connected to the travel member, a support member side connecting portion connected to the support member, and an elastic member which is elastically deformable, wherein the travel member side connecting portion and the support member side connecting portion are connected to each other for relative movement along the vertical direction, wherein the elastic member is interposed between the travel member side connecting portion and the support member side connecting portion, wherein the travel member side connecting portion includes a first portion in which an insert hole is formed, wherein the support member side connecting portion includes a rod-shaped portion inserted in the insert hole along a vertical direction, and a second portion provided to an upper portion of the rod-shaped portion, wherein the elastic member is formed to be generally tubular in shape and is arranged to encircle a side of the rod-shaped portion, wherein the elastic member is held between, and compressed vertically by, an upward-facing surface of the first portion and a downward-facing surface of the second portion, and wherein at least one of the travel member side connecting portion and the support member side connecting portion has a tubular portion that surrounds a side of the elastic member.

11. An article transport vehicle comprising:

a travel member capable of traveling along a travel path;

a support member located below the travel member for supporting an article; and a connecting member which connects the travel member and the support member to each other;

wherein the connecting member includes a travel member side connecting portion connected to the travel member, a support member side connecting portion connected to the support member, and an elastic member which is elastically deformable, wherein the travel member side connecting portion and the support member side connecting portion are connected to each other for relative movement along the vertical direction, wherein the elastic member is interposed between the travel member side connecting portion and the support member side connecting portion, wherein with a direction perpendicular to a longitudinal direction of the travel path as seen along the vertical direction being defined to be a lateral direction, the support member supports a power-receiving portion to which electric power is supplied, without contact, from an electricity supply line which is installed along the travel path and whose position is fixed relative to a travel rail installed along the travel path, wherein the power-receiving portion includes an upper portion located at a higher position than the electricity supply line and a lower portion located at a lower position than the electricity supply line, wherein, with a normal positional relationship being defined to be a positional relationship along the vertical direction between the travel member side connecting portion and the support member side connecting portion when the travel member is at rest and the support member side connecting portion is supported by the travel member side connecting portion through the elastic member, the connecting member includes a first restricting portion for preventing the support member side connecting portion from moving upward relative to the travel member side connecting portion by a distance greater than or equal to a first distance from the normal positional relationship, and a second restricting portion for preventing the support member side connecting portion from moving downward relative to the travel member side connecting portion by a distance greater than or equal to a second distance from the normal positional relationship, and wherein a vertical distance between the electricity supply line and the lower portion is less than the first distance, and wherein a vertical distance between the electricity supply line and the upper portion is less than the second distance.

* * * * *